United States Patent
Denny et al.

[15] 3,643,367
[45] Feb. 22, 1972

[54] THUMB RELEASE ATTACHMENT FOR SPINNING REEL

[72] Inventors: Frank E. Denny, 203 2nd Street P.O. Box 326, Hawthorne, Nev. 89415; Douglas M. Denny, 724 Crane Avenue, Foster City, Calif. 94404

[22] Filed: Dec. 4, 1969

[21] Appl. No.: 882,202

[52] U.S. Cl. ...................................................43/25
[51] Int. Cl. .................................................A01k 89/02
[58] Field of Search.....................................43/25

[56] References Cited

UNITED STATES PATENTS

| | | | |
|---|---|---|---|
| 2,843,963 | 7/1958 | Butehorn | 43/25 |
| 3,045,380 | 7/1962 | Meredith | 43/25 |
| 3,256,633 | 6/1966 | Smith | 43/25 |

Primary Examiner—Samuel Koren
Assistant Examiner—Daniel J. Leach
Attorney—Lothrop and West

[57] ABSTRACT

A housing located on top of the handle of a spinning rod possesses a thumb-actuated latch member capable of selectively retaining or releasing a fishing line extending from a spinning reel (located below the handle) upwardly to the latch member and thence forwardly through the line guides and tip eye to the terminal line tackle. The line is released by a slight movement of the thumb at the appropriate juncture in the casting operation.

4 Claims, 4 Drawing Figures

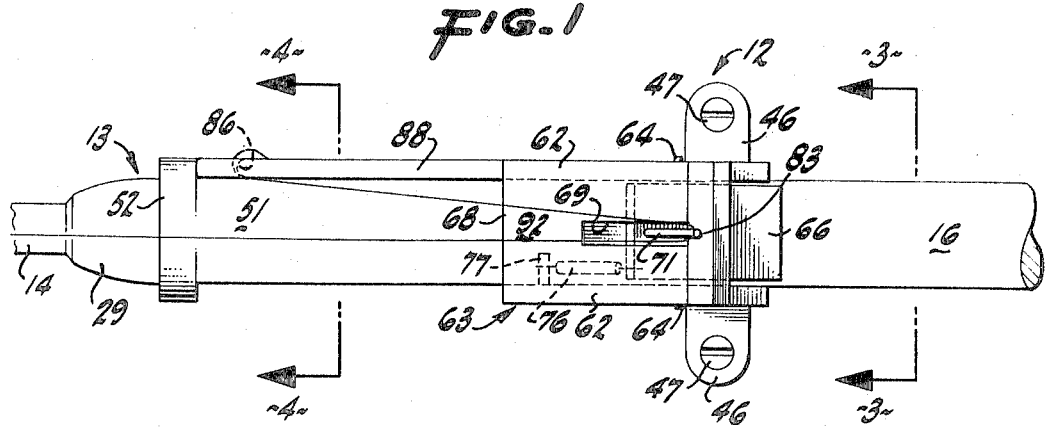
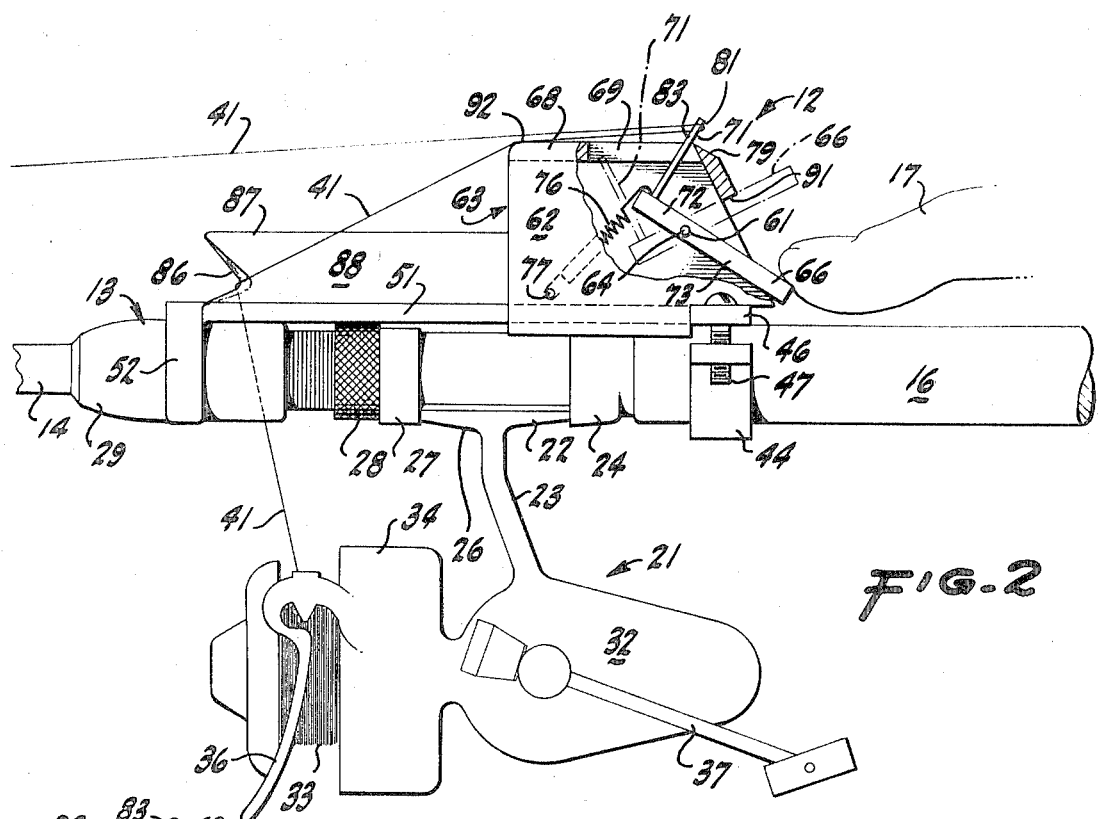

THUMB RELEASE ATTACHMENT FOR SPINNING REEL

The invention relates to improvements in spinning reel control and release mechanisms for use on fishing rods of the spin variety.

With many types of spinning reels, the fishing line is temporarily retained by looping a portion of the line extending from the reel to the forward end of the rod over the tip of the user's index finger. Then, as the cast is made, the index finger is retracted at the appropriate instant, so as to disengage the finger from the line to allow free unwinding of the line from the reel, as the terminal line tackle is projected toward the splash-down location.

Where the fisherman's index finger is incapable of coordinated movement or where finger movement is accompanied by severe pain, as is often the case where an arthritic condition exists, spin fishing becomes painfully burdensome or impossible.

Furthermore, the nice degree of coordination required to effect index finger release at the appropriate time frequently makes spin fishing difficult for many people, such as some small children and some older persons, as well as others, who suffer from various nerve or muscular disorders.

It is therefore an object of the invention to provide a thumb release attachment for a spinning reel which allows many fishermen to use spinning rigs who previously were incapable of doing so.

It is another object of the invention to provide a spinning line release device which can be readily attached to the handle portion of substantially all types of spinning rods.

It is still another object of the invention to provide a spin fishing attachment which is relatively inexpensive and compact, yet is reliable and long lived and has but few moving parts to get out of order.

It is a further object of the invention to provide a spinning rig attachment, the operation of which can quickly be learned even by relatively uncoordinated people.

It is yet another object of the invention to provide a spinning gear release which can be attached either as factory installed equipment or at a subsequent time.

It is an additional object of the invention to provide a generally improved thumb release attachment for a spinning reel.

Other objects, together with the foregoing, are attained in the embodiment described in the following description and illustrated in the accompanying drawings, in which:

FIG. 1 is a fragmentary top plan view of the release attachment installed on the cork covered portion of a spinning rod handle;

FIG. 2 is a side elevational view of FIG. 1;

FIG. 3 is a transverse sectional view, the plane of the section being indicated by the line 3—3 in FIG. 1; and, FIG. 4 is a transverse sectional view, the plane of the section being indicated by the line 4—4 in FIG. 1.

While the release attachment of the invention is susceptible of numerous physical embodiments, depending upon the environment and requirements of use, substantial numbers of the herein shown and described embodiment have been made, tested and used, and all have performed in an eminently satisfactory manner.

The fishing line release attachment of the invention, generally designated by the reference numeral 12, is mounted in longitudinal fashion on top of the handle 13 of a conventional spin fishing rod 14.

In well-known fashion, the user's hand grasps the butt or after portion 16 of the handle 13, with the thumb 17 ordinarily extending forwardly on top of the handle as appears most clearly in FIG. 2.

The spinning reel 21 is customarily mounted on the bottom central portion of the rod handle, with the after arm 22 of a suspended T-bar 23 disposed within an after socket 24 and the forward arm 26 confined by a ring 27 translated into engagement with the arm 26 by a threaded collar 28 with a knurled surface.

Both the butt portion 16 of the handle 13 and the forward portion 29 thereof are covered by a sleeve 31 of a tactilely comfortable and slightly yielding material, such as cork.

Depending from the T-bar 23 is the gear box 32 of the spinning reel, the spool 33 thereof being reciprocated in a fore and aft direction between a forward, extended position relative to the spool cut 34 (as appears in FIG. 2) and a rearward, retracted position, thereby affording an even wind as the spool is rotated during retrieval of the line. A line pick-up bail 36 is provided in some types of reels and a handle 37 is grasped and rotated by the hand not occupied in gripping the rod handle portion 16.

The fishing line 41 extends from the spool 33 of the reel 21, and during retrieval and projection (casting) of the line, the line travels in a substantially linear path, passing through the customary circular line guides (not shown) spaced along the rod and through the tip eye at the forward end of the rod, thence to the conventional terminal tackle arranged near the remote end of the fishing line, and variously including such items as sinkers, lures, hooks, bait, etc.

The release attachment of the invention 12 is securely mounted on the handle 13, by a transversely oriented U-shaped clamp member 43 (see FIG. 3) provided with a pair of drilled and tapped flanges 44 arranged to register with a superposed, transverse keeper plate 46, and to be secured thereto by a pair of threaded fasteners 47, with the handle cork 31 tightly clamped between the U-clamp 43 and the keeper plate 46.

Mounted on the forward edge of the keeper plate 46 is a forwardly extending longitudinal connector member 51 spanning the central portion of the handle and terminating in an inverted U-shaped forward support 52 (see FIG. 4) enclosing the upper one-half of the subjacent forward handle portion 29. If desired, the support member 52 can be of a springy material so as to clamp frictionally the underlying handle cork; however, the U-clamp 44 and keeper plate 46 are ordinarily quite sufficient to afford a secure mounting for the release attachment 12.

Pivotally mounted in a pair of opposed registering openings 61 in the vertical sidewalls 62 of a housing 63 is a transverse, horizontal pin 64 to which is secured a thumb tab 66 swingable between a first, cocked position, shown in full line in FIGS. 1 and 2, and a second, released position, shown in broken line in FIG. 2.

The housing 63 is mounted on and rises upwardly from the fore and aft connector plate 51, and includes, in addition to the vertical sidewalls 62, an elongated fore and aft cover plate 68 having formed therein for a portion of its length a median slot 69 affording a path for the fore and aft travel of a latch pin 71 mounted perpendicularly on the forward end 72 of the thumb tab 66.

Upon depressing the after end 73 of the thumb tab 66 against the urgency of a resilient member, such as a spring 76 secured at its lower end to an anchor pin 77 and suitably hooked at its upper end to the forward, elevated end 72 of the thumb tab 66, the latch pin 71 is swung upwardly and rearwardly in the slot 69 from the retracted position, shown in broken line in FIG. 2, to the projected position, shown in full line in FIGS. 1 and 2.

Rearward movement of the latch pin 71 is limited by the transverse limit stop 79.

Assuming the user of the device to be right-handed, the thumb 17 shown in FIG. 2 will be the right thumb. By depressing the after portion 73 of the thumb tab 66, as previously explained, the latch pin 71 is elevated to its projected position, affording a raised post, as it were, about which can be led the bight 81 of the fishing line 41.

In other words, to effect latching, the thumb tab lever 66 is depressed. Then the user extends his left hand over and across the front portion 29 of the handle 13, and with the fingers and thumb of his left hand reaches downwardly below the handle portion 29 to where the forwardly extending fishing line is located (i.e., the location of the line in its retrieval mode, for example, wherein it extends linearly forwardly from the spool 33 to the nearest, or aftermost, line guide). The left hand fingers and thumb thereupon grasp the line and lift it, carrying it rearwardly, simultaneously forming the bight 81, which is then inserted over the upwardly projecting portion 83 of the latch pin 71.

The rearward movement of the left hand is in such a direction that the portion of the fishing line 41 extending from the spool 33 is led around a V-shaped smoothly rounded, recessed fairlead 86 formed in the forward end 87 of a fore and aft, vertical side plate 88, upstanding from the right-hand edge (see FIG. 4) of the connector 51.

Upon rounding the fairlead 86 (see FIGS. 1 and 2) the fishing line extends rearwardly, then passes once around the rear side of the projecting portion 83 of the latch pin 71 and then extends forwardly and downwardly in a linear reach (see FIGS. 1 and 2) toward and through the aftermost line guide (not shown).

At this juncture, the terminal tackle having previously been positioned for casting, in well known manner, the fisherman cocks his wrist upwardly, carrying the rod with it and then snaps the wrist forwardly and downwardly, so as to whip the rod in the direction of the cast. At the proper instant in the forward motion, the thumb 17 is released, allowing the spring 76 to snap the pin 71 forwardly into the broken line position shown in FIG. 2, with the thumb tab 66 stopped in its movement by abutment with the lower end 91 of the limit stop 79. The forward movement of the latch pin 71 is accompanied by retraction of the latch portion 83 below the upper surface 92 of the cover plate 68, thereby casting the bight 81 of the line 41 off the projecting latch portion 83 and allowing the line to shoot forwardly and to unwind from the spool as the cast progresses.

It will be noted that total control of the line is effected by merely a slight movement of the user's thumb, this being the strongest digit and one which frequently is not as affected by arthritis, and the like, insofar as pain-free freedom of motion is concerned.

After retrieval of the line 41 by rotation of the handle 37 (using the left hand) the latch pin 71, or trigger, is again cocked by the thumb 17, and the line 41 is again looped in a bight around the latch pin, thereby completing the cycle.

It can therefore be seen that we have provided a reliable line releasing device which affords a nice sense of control over the casting operation and which can effectively be employed by many people who would otherwise be unable to use the spinning method of fishing.

What is claimed is:

1. A thumb release attachment for a spinning reel located below the handle of a spin fishing rod, said attachment comprising:
    a. an elongated housing mounted in a fore and aft direction on top of the rod handle;
    b. a tab member pivotally mounted on said housing for movement between a first position in engagement with the operator's thumb and a second position disengaged from the thumb;
    c. a latch pin carried on said tab, said pin projecting from said housing in said first position of said tab to receive the bight of a fishing line extending from the spool of said reel toward the terminal end of the line, said line end being provided with terminal tackle to afford a line withdrawing force during casting, said pin being retracted into said housing in said second position of said tab to release said bight as said tab moves from said first to said second position upon disengagement from the thumb during casting;
    d. biasing means connected to said tab for urging said tab from said first position toward said second position; and,
    e. a line guide located adjacent said housing and laterally displaced on a predetermined side of a fore and aft plane through said tab, said guide directing said fishing line on a first run extending from said spool to said guide and on a second run extending from said guide to said latch pin, said first and second runs of said line being entirely located on said predetermined side of said fore and aft plane.

2. A device as in claim 1 wherein said biasing means is a tension spring mounted at one end on said housing and at the other end of said tab.

3. A device as in claim 1 wherein said line guide is located substantially in a plane perpendicular to the axis of said rod and including said spool of said reel.

4. A device as in claim 1 wherein the after end of said tab lies aft of a plane perpendicular to the axis of said rod and including the after end of said reel.

* * * * *